(12) United States Patent
Krytenberg

(10) Patent No.: US 12,286,557 B2
(45) Date of Patent: Apr. 29, 2025

(54) AQUEOUS SILICONE ELASTOMERS AS ANTI-GRAFFITI COATINGS

(71) Applicant: Industrial Control Development, Inc., Ridgefield, WA (US)

(72) Inventor: Timothy Krytenberg, Ridgefield, WA (US)

(73) Assignee: Industrial Control Development, Inc., Ridgefield, WA (US)

( * ) Notice: Subject to any disclaimer, the term of this patent is extended or adjusted under 35 U.S.C. 154(b) by 133 days.

(21) Appl. No.: 17/945,614

(22) Filed: Sep. 15, 2022

(65) Prior Publication Data

US 2023/0100256 A1  Mar. 30, 2023

Related U.S. Application Data

(60) Provisional application No. 63/248,902, filed on Sep. 27, 2021.

(51) Int. Cl.
*C09D 183/06* (2006.01)

(52) U.S. Cl.
CPC .................. *C09D 183/06* (2013.01)

(58) Field of Classification Search
CPC .................................................. C09D 183/06
See application file for complete search history.

(56) References Cited

U.S. PATENT DOCUMENTS

| | | | |
|---|---|---|---|
| 6,437,039 B1 * | 8/2002 | Ahmed | C09D 183/04 524/265 |
| 8,277,555 B2 | 10/2012 | Atsuchi et al. | |
| 9,523,022 B2 | 12/2016 | Johnson et al. | |
| 2007/0291586 A1 * | 12/2007 | Zwieg | C09D 183/08 366/349 |
| 2009/0076217 A1 * | 3/2009 | Gommans | C09D 183/04 524/588 |
| 2010/0022738 A1 | 1/2010 | Hashemzadeh | |
| 2020/0317906 A1 * | 10/2020 | Gernandt | C08F 2/38 |
| 2022/0145126 A1 | 5/2022 | Krytenberg | |
| 2022/0363945 A1 * | 11/2022 | Tate | C09D 183/06 |

FOREIGN PATENT DOCUMENTS

WO   WO 2014/110373   7/2014

OTHER PUBLICATIONS

CSL Silicones, Inc., "Si-COAT® 530AG™ Remarkable® Anti-Graffiti Protective Coating—Clear Technical Data Sheet," Jun. 23, 2017.

* cited by examiner

*Primary Examiner* — Austin Murata

(74) *Attorney, Agent, or Firm* — Klarquist Sparkman, LLP

(57) ABSTRACT

A method that includes coating a liquid aqueous silicone elastomer-containing composition onto an architectural surface, a signage surface, a built landscape surface or a commercial super structure surface, and then drying the liquid aqueous silicone elastomer-containing composition resulting in forming a silicone elastomer-containing anti-graffiti coating on the architectural surface, the signage surface, the built landscape surface, or the commercial super structure surface.

6 Claims, No Drawings

AQUEOUS SILICONE ELASTOMERS AS ANTI-GRAFFITI COATINGS

CROSS-REFERENCE TO RELATED APPLICATIONS

This application claims the benefit of U.S. Provisional Application No. 63/248,902 filed Sep. 27, 2021, which is incorporated herein by reference in its entirety.

BACKGROUND

Current anti-graffiti coatings are broken into two categories: sacrificial and permanent. Sacrificial coatings are removed alongside the graffiti during any cleaning process and require re-application after each graffiti removal. Permanent anti-graffiti coatings remain after graffiti removal and continue to provide graffiti protection to the substrate for multiple cleaning and tagging cycles. Silicone based coatings are considered premier permanent anti-graffiti products as their low surface energy makes it difficult for non-silicone based paints to adhere. Current silicone based anti-graffiti coatings are room temperature vulcanizing (RTV) silicone rubbers diluted in solvent with high volatile organic compounds (VOCs) and require solvents for equipment cleaning. This raises environmental concerns, exposes workers to hazardous solvents, and is more hazardous to ship and store as most organic solvents are flammable.

SUMMARY

Disclosed herein is a method comprising:
coating a liquid aqueous silicone elastomer-containing composition onto an architectural surface, a signage surface, a built landscape surface, or a commercial super structure surface, and
then drying the liquid aqueous silicone elastomer-containing composition resulting in forming a silicone elastomer-containing anti-graffiti coating on the architectural surface, the signage surface, the built landscape surface, or the commercial super structure surface.

The foregoing will become more apparent from the following detailed description.

DETAILED DESCRIPTION

Described herein is the use of an aqueous silicone elastomer-containing composition in anti-graffiti coatings for a surface. The aqueous silicone anti-graffiti coating reduces the VOCs emitted, is cleanable with water, and is non-flammable for easier storage and handling.

Illustrative surfaces include an architectural surface, a signage surface, a built landscape surface, or a commercial super structure surface. For example, an architectural surface may be a surface of a building. For example, a signage surface may be a surface of sign (e.g., a highway sign). For example, a built landscape surface may be a surface of a retaining wall, a surface of a decorative wall, or a surface of a statue. For example, a commercial super structure surface may be a bridge or an overpass. The silicone-containing composition is directly applied to a surface as a sprayable, brush-coatable, or roller-coatable liquid. In certain embodiments, the surface may be wood, an engineered wood composite, plastic, concrete, metal, glass, brick, masonry, exterior insulation finishing system (EIFS), stone, or fiberglass. The silicone-containing composition can be applied to painted surfaces (e.g. painted concrete walls). Such paints are typically architectural paints (e.g. from Sherwin Williams, Home Depot, etc.) which are usually acrylic latex based paints.

The aqueous silicone elastomer can be used as the sole binder in the coating composition, meaning that the aqueous silicone elastomer does not have to blended with another binder.

In certain embodiments, the coating disclosed herein is applied onsite to a standing surface. In certain embodiments, the standing surface may be a surface of a building, sign, or wall.

The silicone elastomer-containing coating exhibits advantageous weather resistance, water resistance, flexibility and elongation even at temperature extremes. The silicone elastomer-containing coating displays superior elongation and a high tensile strength, even at temperatures as low as −20° C. For example, the silicone elastomer-containing coating can have a percent elongation of at least 500%, more particularly at least 700%, at ambient temperature. The silicone elastomer-containing coating can have a percent elongation of at least 500%, more particularly at least 700%, at −20° C. The silicone elastomer-containing coating can have a tensile strength of at least 500 psi, more particularly at least 600 psi, at ambient temperature. The silicone elastomer-containing coating can have a tensile strength of at least 500 psi, more particularly at least 600 psi, at −20° C.

In certain embodiments, the anti-graffiti coating has a dry thickness of 2.54 μm to 762 μm.

The silicone elastomer-containing coating also displays superior weather and UV stability when tested in QUV accelerated weatherometer. For example, the silicone elastomer-containing coating can have a mass retention of at least 95%, more particularly at least 97%, over a period of 2000 hours QUV. The silicone elastomer-containing coating can have a gloss retention of at least 90%, more particularly at least 95%, over a period of 2000 hours QUV. The silicone elastomer-containing coating can have a color loss of less than one ΔE over a period of 2000 hours QUV.

The improved weather resistance and physical properties is beneficial for the coating to retain its physical properties under extreme cold for regions that regularly experience harsh winters.

Additionally, the silicone elastomer-containing composition is naturally clear. The naturally clear composition allows for the option of formulating the silicone elastomer-containing composition to any desired color by adding color additives to the composition.

Aqueous Silicone Elastomer and Compositions Containing the Elastomer

The aqueous silicone elastomer can be any silicone that forms an elastomer in an aqueous system. The aqueous silicone elastomer is free of any solvents, particularly volatile organic solvents (VOCs), other than water. Several illustrative aqueous silicone elastomers are described below.

In a first embodiment, an aqueous silicone elastomer may be manufactured with cyclic monomer(s) as a starting reactant via ring-opening polymerization. This method uses cyclic siloxane monomer(s) such as hexamethylcyclotrisiloxane (D3), octamethylcyclotetrasiloxane (D4), or decamethylcyclopentasiloxane (D5). They differ only in the number of siloxane units in the ring. D3 has three siloxane units, D4 has four, and D5 has five. D4 is the most commonly used cyclic for ring-opening-polymerization (ROP).

The cyclic monomers are polymerized by a strong acid catalyst that also functions as an emulsifying agent, known as a surfcat. A surfcat is typically any sulfuric or sulfonic acid, or a salt thereof, that includes a fatty acid or fatty ester moiety. Illustrative surfcats include dodecylbenzenesulfonic acid, sodium lauryl sulfate, sodium olefin sulfonate and sodium dioctyl sulfosuccinate. If the surfcat is in the acid form, it can be used as is. If it is neutralized to form a salt, then the acid form of the catalyst must be regenerated using another strong acid like HCl or $H_2SO_4$. Surfactants other than the surfcat may be used (optional), such as non-ionic surfactants or anionic surfactants that are not strong acids.

The cyclic monomer and the surfcat are emulsified together with water and any optional surfactants or optional crosslinkers. If the salt form of a surfcat is used (such as sodium lauryl sulfate) then the acid form of the surfcat is regenerated by adding in a stronger acid like HCl or $H_2SO_4$. The emulsion is then allowed to polymerize either ambiently or by heating the mixing vessel to 60° C.-90° C. This ring-opens the cyclic monomer and chain extends, creating very high molecular weight linear polydimethylsiloxane. For example, the polydimethylsiloxane may a molecular weight of 250,000-500,000 g/mol.

In certain embodiments, 85-90% of the cyclic monomers are converted into a linear polydimethylsiloxane, and the polymerization can take as long as three weeks under ambient conditions.

Optionally, a crosslinking agent such as a silane or colloidal silica may be added during polymerization.

The surfcat is then neutralized to halt polymerization by adding in a base. This can be any base such as an amine, a metal hydroxide, or a metal carbonate.

The emulsion is then converted from an emulsion of silicone oil to a dispersion of silicone rubber via crosslinking by adding in a filler like colloidal silica, a crosslinker like a silane (optional), and an organotin catalyst. Methyltrimethoxysilane is a preferred silane. The organotin catalyst can be either a divalent tin or a tetravalent tin catalyst. The divalent tin catalyst may be any organotin with a 2+ oxidation state and organic ligands. Examples include tin(II) ethylhexanoate, tin(II) acetylacetonate, and tin(II) acetate. The tetravalent tin catalyst may be any organotin with a 4+ oxidation state, two covalently bonded organic groups and two ligands. Examples include dibutyltindilaurate, dibutyltindiacetate, and dioctyltindilaurate.

The resulting product is an aqueous dispersion of crosslinked polydimethylsiloxane. In certain embodiments, the resulting product is a dimethyl siloxy silsesquioxane. In certain embodiments, the resulting product has a molecular weight of 100,000 to 500,000 g/mol. In certain embodiments, the resulting product has a solids content of 5-75 wt %, preferably 40-60%.

In certain embodiments, the resulting product may have a viscosity of 100 cPs to 10000 cPs, preferably 100 to 500 cPs, at 23° C.

In a second embodiment, an aqueous silicone elastomer may be manufactured via linear monomer(s) as a starting reactant. In this embodiment, the starting material is a linear polydimethylsiloxane which are terminated with silanol groups (Si—OH) which allow for polymerization via acid catalyzed condensation. These silanol fluids are classed based on their viscosity, and the most useful for this polymerization method are those in the 1-200 cPs range at 23° C.

This embodiment may include an optional crosslinking agent as in the ROP method described above.

This embodiment also uses a surfcat as in the ROP method described above. Other surfactants such as non-ionic surfactants, etc. may optionally be used in addition to the surfcat.

The silanol fluid, any optional ingredients, the surfcat, and water are emulsified together. If the salt form of a surfcat is used, the surfcat is activated by the addition of a strong acid like HCl or $HSO_4$. The emulsion is allowed to polymerize either ambiently or by heating the vessel. Polymerization is halted by the addition of a base such as an amine, metal hydroxide, or metal carbonate.

The emulsion is then converted from an emulsion of silicone oil to a dispersion of silicone rubber via crosslinking by adding in a filler like colloidal silica, a crosslinker like a silane (optional), and an organotin catalyst. Methyltrimethoxysilane is a preferred silane. The organotin catalyst can be either a divalent tin or a tetravalent tin catalyst. The divalent tin catalyst may be any organotin with a 2+ oxidation state and organic ligands. Examples include tin(II) ethylhexanoate, tin(II) acetylacetonate, and tin(II) acetate. The tetravalent tin catalyst may be any organotin with a 4+ oxidation state, two covalently bonded organic groups and two ligands. Examples include dibutyltindilaurate, dibutyltindiacetate, and dioctyltindilaurate. The emulsion is then converted from an emulsion of silicone oil to a dispersion of silicone rubber via crosslinking by adding in a filler like colloidal silica, a crosslinker like a silane (optional), and an organotin catalyst. Methyltrimethoxysilane is a preferred silane. The organotin catalyst can be either a divalent tin or a tetravalent tin catalyst. The divalent tin catalyst may be any organotin with a 2+ oxidation state and organic ligands. Examples include tin(II) ethylhexanoate, tin(II) acetylacetonate, and tin(II) acetate. The tetravalent tin catalyst may be any organotin with a 4+ oxidation state, two covalently bonded organic groups and two ligands. Examples include dibutyltindilaurate, dibutyltindiacetate, and dioctyltindilaurate.

In certain embodiments, 99-100% of the linear monomers are converted into a polymer, and the polymerization takes 8-24 hours under ambient conditions.

The resulting product is an aqueous dispersion of crosslinked polydimethylsiloxane.

A third embodiment involves direct emulsification with no polymerization. In this method a linear, silanol terminated polydimethylsiloxane fluid similar to the second embodiment is used. However, the MW/viscosity of the starting fluid is much higher (10,000-100,000 cPs at 23° C.) and no polymerization takes place. No surfcat is used in the third embodiment, only a non-ionic surfactant(s).

The silanol fluid, surfactant(s), and water are emulsified.

The emulsion is then converted from an emulsion of silicone oil to a dispersion of silicone rubber via crosslinking by adding in a filler like colloidal silica, a crosslinker like a silane (optional), and an organotin catalyst. Methyltrimethoxysilane is a preferred silane. The organotin catalyst can be either a divalent tin or a tetravalent tin catalyst. The divalent tin catalyst may be any organotin with a 2+ oxidation state and organic ligands. Examples include tin(II) ethylhexanoate, tin(II) acetylacetonate, and tin(II) acetate. The tetravalent tin catalyst may be any organotin with a 4+ oxidation state, two covalently bonded organic groups and two ligands. Examples include dibutyltindilaurate, dibutyltindiacetate, and dioctyltindilaurate. The emulsion is then converted from an emulsion of silicone oil to a dispersion of silicone rubber via crosslinking by adding in a filler like colloidal silica, a crosslinker like a silane (optional), and an organotin catalyst. Methyltrimethoxysilane is a preferred silane. The organotin catalyst can be either a divalent tin or a tetravalent tin catalyst. The divalent tin catalyst may be any organotin with a 2+ oxidation state and organic ligands. Examples include tin(II) ethylhexanoate, tin(II) acetylacetonate, and tin(II) acetate. The tetravalent tin catalyst may be any organotin with a 4+ oxidation state, two covalently bonded organic groups and two ligands. Examples include dibutyltindilaurate, dibutyltindiacetate, and dioctyltindilaurate.

The resulting product is an aqueous dispersion of cross-linked polydimethylsiloxane.

Additives may be included with the aqueous silicone elastomer to formulate a final coating composition. Illustrative additives include fillers, pigments, binders, defoamers, rheology modifiers, or other additives common to paints.

For example, the aqueous silicone elastomer can optionally be mixed with at least one filler such as calcium carbonate, nepheline syenite, barium sulfate, diatomaceous earth, kaolin clay, pumice, etc.

The composition can be tinted any color by mixing the aqueous silicone elastomer with a pigment. For example, the aqueous silicone elastomer can optionally be mixed with titanium dioxide, or other white pigments, making the coating bright white. In another example the aqueous silicone elastomer can optionally be mixed with aluminum flake pigments making the coating silver.

The coating composition can also optionally include a binder. For example, the aqueous silicone elastomer can be blended with an organic, water-based binder such as an acrylic or a polyurethane. The acrylic or polyurethane binder can be an acrylic latex or a polyurethane dispersion that has a pH of >7. The amount of binder included in the composition may range from 5-30 wt %, based on the wet weight of the total composition.

In certain embodiments, the aqueous silicone elastomer in the final coating composition is present in an amount of 35-99 wt %, based on the wet weight of the total composition.

EXAMPLES

| Property | Value | Unit of Measure | Test Method |
| --- | --- | --- | --- |
| Graffiti Removal | Cleanability 1 | Graffiti completely removed with high pressure cold water wash | ASTM D7089 |
| Graffiti Removal | Cleanable with dry rag | Permanent marker | ASTM D6578 |
| Graffiti Removal | Cleanable with Isopropyl alcohol | Acrylic spray paint | ASTM D6578 |
| Graffiti Removal | Cleanable with Isopropyl alcohol | Alkyd spray paint | ASTM D6578 |
| Graffiti Removal | Cleanable with dry rag | Wax crayon | ASTM D6578 |
| Graffiti Removal | Cleanable with detergent | Ballpoint pen | ASTM D6578 |
| Graffiti Removal | Cleanable with dry rag | Water-based marker | ASTM D6578 |

ASTM D6578
Coating was applied to wooden substrate via brush and allowed to cure ambiently for 7 days. Panels were tagged with graffiti in 1"×1" squares and allowed to sit ambiently for 24 hours then evaluated for graffiti removal. Attempted to remove each marking material from the panel with a cotton cloth alone, then by using a cotton cloth that has been wetted with the following cleaning agents, working through them in the order listed (increasing strength):
(a) mild detergent
(b) isopropyl alcohol (IPA)
(c) mineral spirits
(d) xlyene
(e) methyl ethyl ketone (MEK)

Results for each graffiti marking material are listed in the table above.

ASTM D7089
Coating was applied to concrete substrate via spray and allowed to cure ambiently for 7 days. Graffiti was then applied via spray can (Krylon exterior gloss enamel from Fred Meyers) and allowed to cure for 7 days. Wall was then cleaned with a 2500 PSI power washer. The graffiti was completely removed without damaging the silicone coating underneath.

In view of the many possible embodiments to which the principles of the disclosed invention may be applied, it should be recognized that the illustrated embodiments are only preferred examples of the invention and should not be taken as limiting the scope of the invention.

What is claimed is:

1. A method comprising:
    coating a liquid aqueous silicone elastomer-containing composition onto an architectural surface, a signage surface, a built landscape surface, or a commercial super structure surface, wherein the liquid aqueous silicone elastomer-containing composition comprises a dimethyl siloxy silsesquioxane that is produced from ring opening polymerization of at least one cyclic siloxane monomer, and
    then drying the liquid aqueous silicone elastomer-containing composition resulting in forming a silicone elastomer-containing anti-graffiti coating on the architectural surface, the signage surface, the built landscape surface, or the commercial super structure surface.

2. The method of claim 1, wherein the cyclic siloxane monomer is hexamethylcyclotrisiloxane, octamethylcyclotetrasiloxane, or decamethylcyclopentasiloxane.

3. The method of claim 2, wherein the aqueous silicone elastomer in the composition is present in an amount of 35-99 wt %, based on the wet weight of the total composition.

4. The method of claim 1, wherein the anti-graffiti coating has a dry thickness of 2.54 µm to 762 µm.

5. The method of claim 1, wherein the aqueous silicone elastomer in the composition is present in an amount of 35-99 wt %, based on the wet weight of the total composition.

6. The method of claim 1, wherein the aqueous silicone elastomer is the only film-forming polymer present in the composition.

* * * * *